Jan. 7, 1969
R. N. FRANKLIN
3,420,091
GAS LEAK DETECTION
Filed April 1, 1966
Sheet 1 of 3
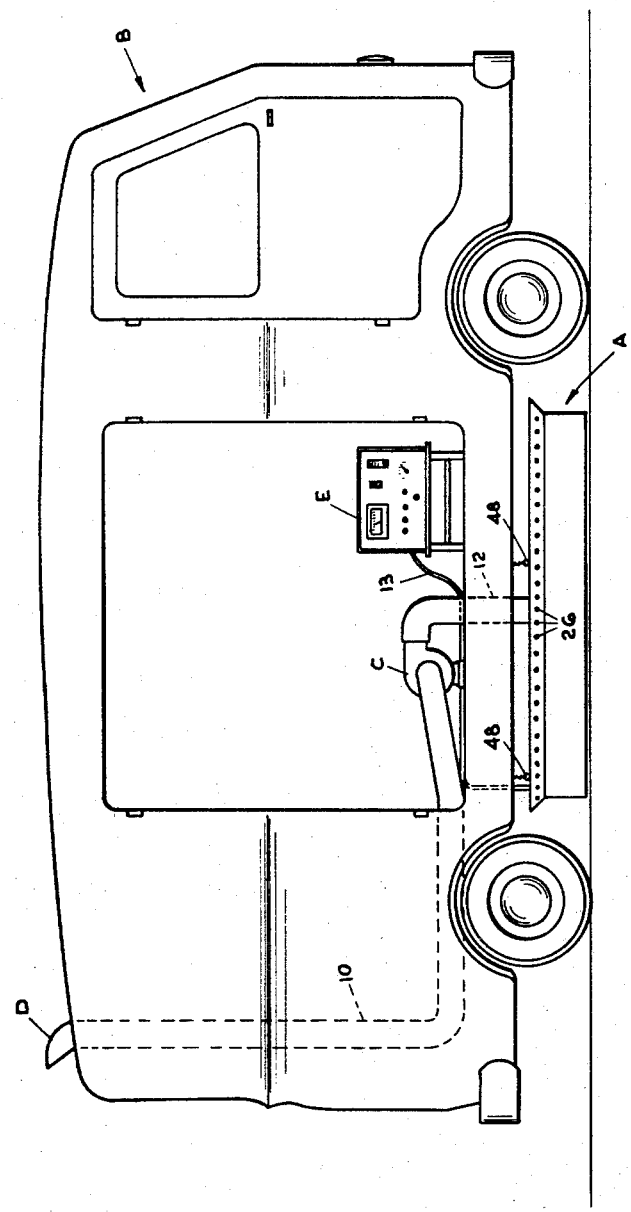
INVENTOR.
RUSSELL N. FRANKLIN
BY
*Harry G. Shapiro*
ATTORNEY

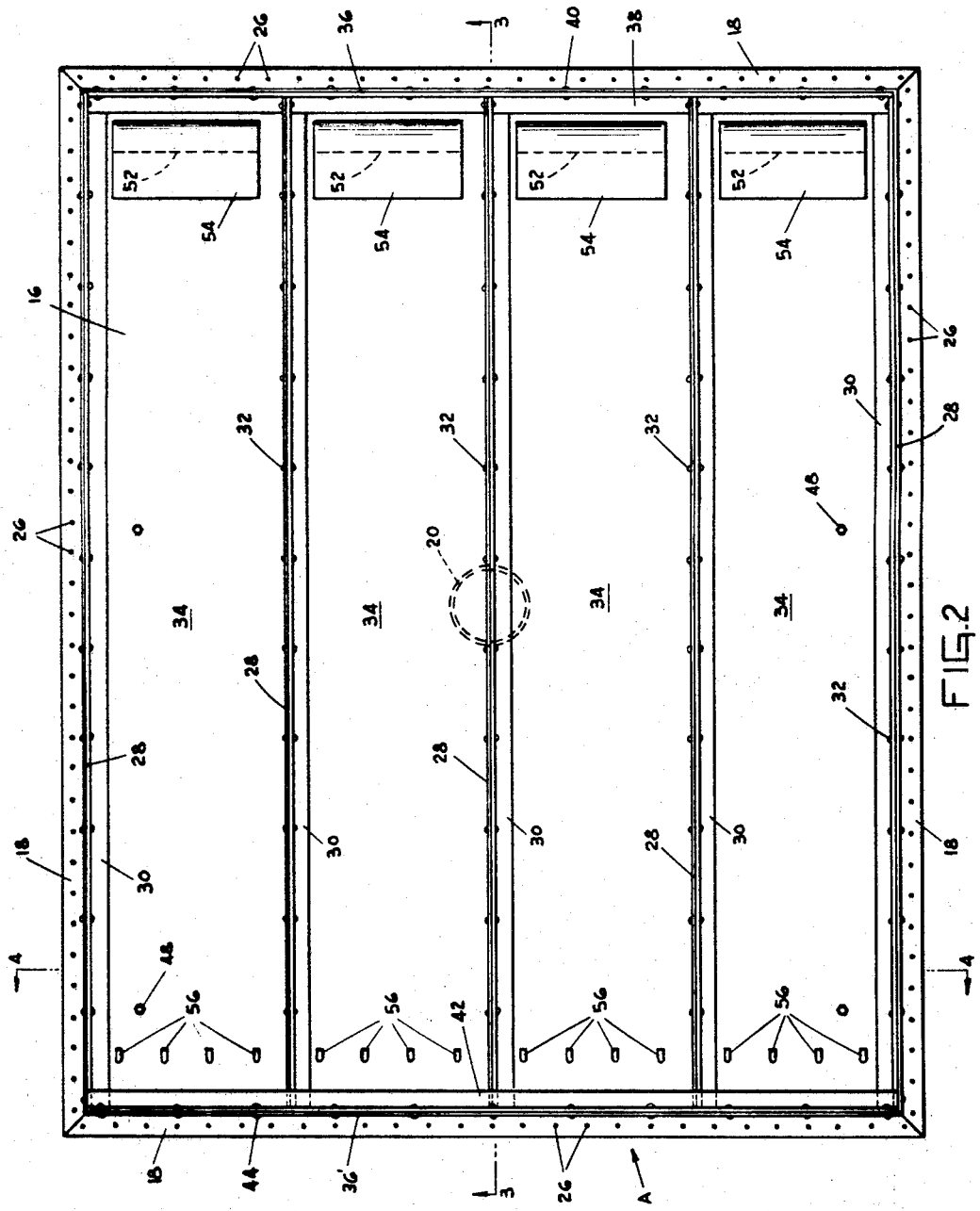

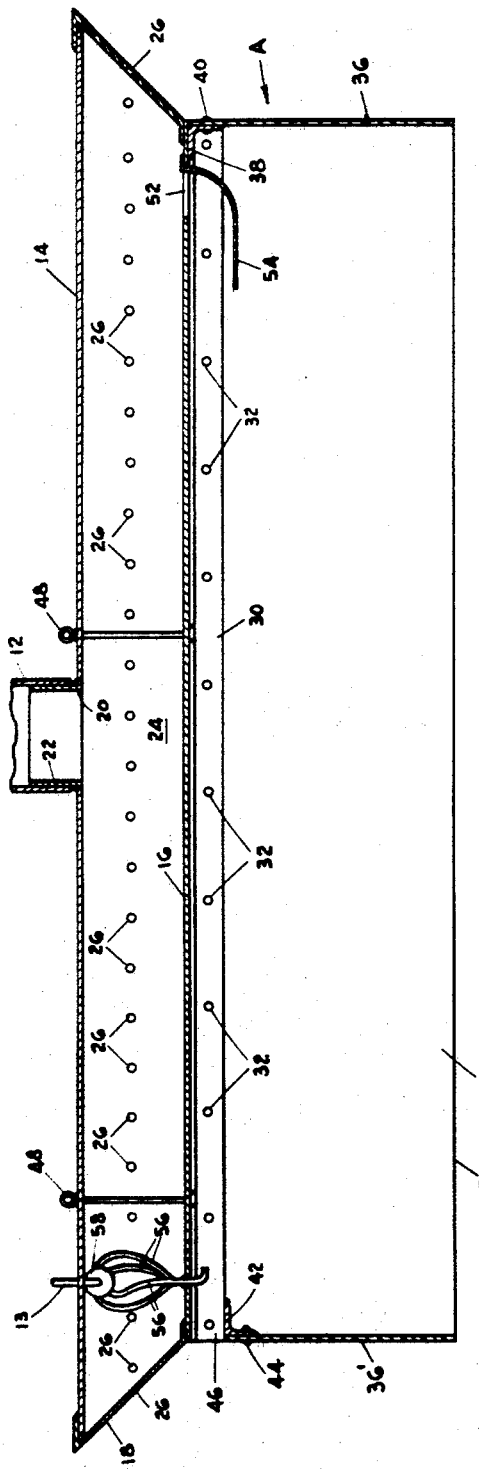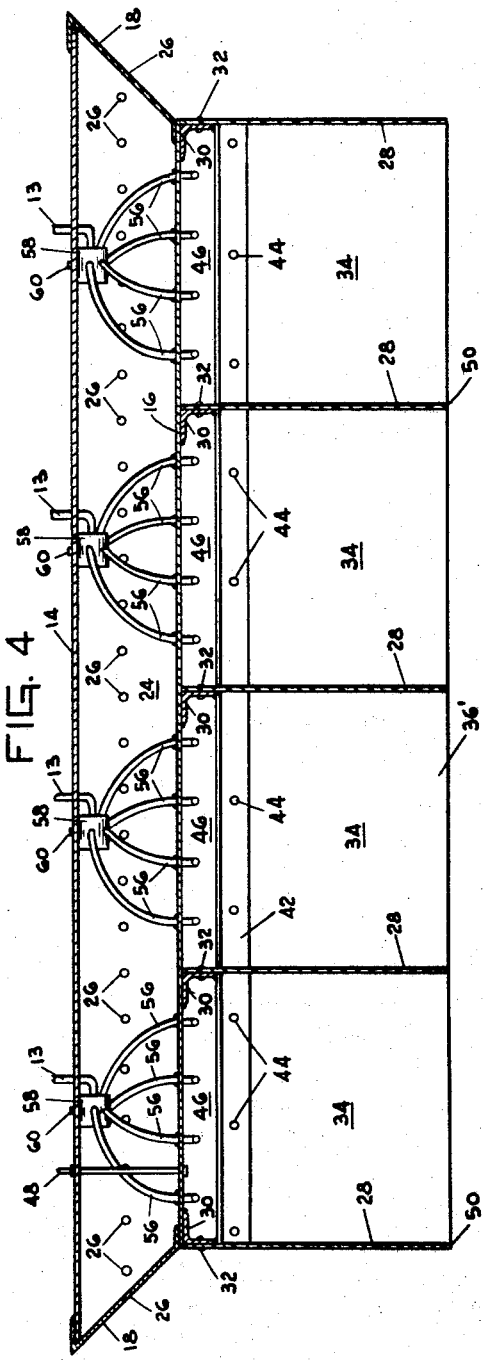

United States Patent Office 3,420,091
Patented Jan. 7, 1969

3,420,091
GAS LEAK DETECTION
Russell N. Franklin, 261 Spruce St.,
Bloomfield, N.J. 07003
Filed Apr. 1, 1966, Ser. No. 539,356
U.S. Cl. 73—23                                14 Claims
Int. Cl. G01n 31/00

The invention relates to improvements in means for detecting gas leaks and is more particularly directed to such means mounted on a vehicle.

Vehicular mounted gas leak detection apparatus is known in the art. Known apparatus of this type possess several limitations. Firstly, a comparatively small area is scanned or probed along the path of movement of the vehicle. Secondly, gas analyzing means mounted in the moving vehicle is contaminated by extraneous gases, that is, by automobile exhaust gases and the like. Thirdly, the speed or the rate that the leaking gas in transmitted to the gas analyzing means within the vehicle is relatively slow, thereby limiting the speed that the vehicle may travel.

An object of the invention is to provide means for detecting gas leaks which permits probing a wide area at a rapid rate and to enable localizing the zone where there is gas escaping or leaking from a main.

Another object of the invention is to provide the means for detecting gas leaks having the characteristics as above described with means for preventing contamination by extraneous gases of the gases it is desired to sample or detect to thereby avoid false and misleading readings on the gas analyzing means.

A further object of the invention is to provide a vehicle with a gas leak detection system which enables the survey of large areas at a high rate of speed with a substantial degree of accuracy.

These, and other objects and advantages of the invention will be apparent from the following detailed taken in conjunction with the drawings which illustrate a preferred embodiment of the invention, in which:

FIG. 1 is a schematic side elevational view of a gas leak detection system in accordance with the invention mounted in and on a motor vehicle;

FIG. 2 is a bottom plan view looking at the underside of the hood unit of the system which is mounted in close proximity to a roadway over which the vehicle is to travel to detect leaks;

FIG. 3 is a vertical cross-sectional view taken approximately in the plane of line 3—3 of FIG. 2, this view showing the hood oppositely oriented, or as it is oriented when attached to a vehicle; and FIG. 4 is a vertical cross-sectional view taken approximately in the plane of line 4—4 of FIG. 2, this section also being oriented as the showing of FIG. 3;

Referring to the drawings, and in accordance with the invention generally, a hood A is provided for attachment to a vehicle B so that the hood is positioned in close proximity to a roadway. The hood, while it may be mounted on a frame to extend in front of the vehicle, is preferably attached to the underside of the vehicle intermediate the front and rear wheels thereof. As will be later described, the hood has substantial width in addition to having substantial length in order that a comparatively large area of the roadway may be probed or scanned for leaking gas.

The gas detection system of which the hood A is a part comprises a high pressure air blower C mounted within the vehicle. The blower is driven by a suitable motor (not shown). The motor may be driven by a 110 volt AC generator connected to the fan pulley of the vehicle or truck. The blower supplies a high volume of relatively clean, fresh air to the hood A for purposes to be hereafter described. This is accomplished by providing an air intake or duct D located remote from the roadway. As shown in FIG. 1, it is preferred to mount the air intake on the top of the vehicle. The air intake D is connected to the blower C by a suitable hose 10 and the exit side of the blower is connected to the hood A by an exhaust hose 12.

As also shown in FIG. 1, a gas analyzer E is mounted within the vehicle to be read by an observer when the vehicle is in motion and the system operating to detect gas leaks along the path of travel. The gas analyzer or detector is connected to a series of hoses 13. The gas analyzer may be of any suitable type, for example, a Flame Ionization Meter as made by the Davis Emergency Equipment Co. Inc., Newark, N.J.

The particular gas analyzing means does not constitute any part of the present invention; any desired gas analyzing means may be used. A heavy duty alternator (not shown) connected to the fan pulley of the truck may be used to supply current to the gas analyzing meter.

In greater detail, and as shown in FIGS. 2–4, the hood A comprises a top plate or frame member 14. The frame member may be of any structurally strong material such as a steel plate. A second plate or wall member 16 is disposed beneath the frame member to extend substantially parallel thereto and is vertically spaced therefrom. It will be understood that the relative position of the parts or their orientation are herein described not by way of limitation but to enable a more ready understanding of the device; hence, orientation is expressed with relation to the position of the hood and its parts when attached to a vehicle and with reference to the front and rear ends of the vehicle.

The frame and wall members are substantially rectangular in outline. The frame and wall members 14 and 16 are maintained in desired spaced relationship by side walls 18. As shown in FIGS. 3 and 4, the wall member 16 has a length and width somewhat less than the like dimensions of the frame member so that when the side walls 18 are connected to them as by welding, the side walls are inwardly slanted, preferably at an angle of approximately 45°. The purpose of such angularity of the side walls will be subsequently described.

As shown in FIG. 3, the frame member 14 is provided with an opening or air inlet 20. The air inlet is provided with an upstanding annular nipple 22 over which the hose 12 leading to the blower C is forced for a firm connection. The frame and the wall members 14 and 16, together with the side walls 18 provide an air chamber 24. A plurality of spaced holes or orifices 26 are provided to extend through the side walls 18. As shown in FIG. 2, the side wall orifices extend entirely around or on all sides of the hood to place the air chamber 24 in communication with the ambient atmosphere. Since the side walls are disposed at a receding angle (FIGS. 3 and 4), air under pressure within the chamber 24 will be directed through the orifices 26 in a downward direction.

As shown in FIGS. 2, 3 and 4, a plurality of transversely spaced partitions 28 are secured to extend longitudinally from the underside of the wall member 16. Preferably, the partitions are equidistantly spaced as illustrated. The partitions are secured to the wall member in any suitable manner, for example, as by spacing and welding a plurality of angle irons 30 to the wall member 16 and fastening the partitions along their top edges to the angle irons with rivets 32, as shown in FIG. 4. The partitions are of any suitable gas impervious material such as canvas or a heavy fabric which is rubberized and relatively stiff. Means are extended across the ends of the partitions to provide longitudinally extending compartments 34 open to the bottom of the hood. Such end closure means may take the form of a strip 36 at the front end of the hood and a strip 36' at the rear end. The end strips 36 and 36' may also be of rubberized fabric. As shown in FIG. 3, the front end strip is fastened to an angle iron 38 by transversely spaced rivets 40, the angle iron being connected to the wall member 16 as by welding. The rear end strip is fastened to an angle iron 42 by a plurality of rivets 44. The angle iron 42, however, instead of being secured to the wall member, is secured to the lower side of the angle irons 30 to thereby provide an air vent 46 at the top of each of the compartments at their rear ends.

While in the form of the invention illustrated, there are four compartments 34 provided by the five partitions, it is within the scope of the invention to provide any desired number of compartments. By way of illustration and not of limitation, it has been found that a hood which furnishes an effective working area of five feet in width and five and a half feet in length with the illustrated number of compartments furnishes satisfactory results. Such width is substantially equal to the width of the underside of a truck and such length leaves clearance between the front and rear wheels of the truck. When the hood is attached to the underside of a truck, as by means of eye bolts 48 extended through the frame and wall members, the lower extremities 50 of the partitions 28 which define the compartments 34 will clear the roadway by a few inches.

While not essential to realize certain advantages of the invention, it is preferred to provide means for rapidly conveying a detected gas to the gas analyzer. Accordingly, and as illustrated in FIGS. 2 and 4, the wall member 16 is provided with a series of air outlets 52, one for each compartment 34, the air outlets leading from the air chamber 24 to the respective compartments. The air outlets 52 are located at the front end of the hood in the sense of the hood's position with relation to the vehicle, that is, the end of the hood closest to the front end of the vehicle. In order to strongly direct air lengthwise of each compartment as it is blown into the air chamber 24 and out through the outlets 52, a baffle 54 is associated with each air outlet. Gas pick-up means is positioned in and at the rear end of each compartment 34. Such gas pick-up means may be in the form of a tube or a plurality of tubes 56. For more accurate detection, a plurality of tubes is preferred and in the illustrated embodiment of the invention four gas pick-up tubes are shown for each compartment. These tubes, which are in communication with the gas analyzer E, have their open ends positioned near the top of each compartment 34, with the air vents 46 rearward of the tubes' open ends. As shown in FIGS. 3 and 4, the tubes are extended through the wall member 16 and have their open ends facing toward the front ends of the compartments. While the tubes may lead directly to the gas analyzer, it is preferred to minimize the amount of tubing and for this purpose a manifold 58 is provided for each set of tubes in a compartment.

As shown in FIGS. 3 and 4, each manifold 58 is secured to the underside of the frame member 14 as by a headed screw 60. The plurality of gas sampling tubes 56 lead into the manifold and a single tube 13 conveys the gas sample from each manifold to the gas analyzer E.

The operation of the system is as follows. With the vehicle in motion and the motor turned on to drive the blower, and the gas analyzer E in readiness for reading to detect leaking gas, the hood A immediately overlying the roadway probes a substantial area by virtue of the substantial width and length of the hood A. Comparatively clean air is taken in at the intake D and is forced by the blower C into the air chamber 24. The air under the pressure of the blower follows several paths. Air is forced out of the orifices 26. Due to the angle at which the orifices are disposed, a curtain of air surrounds the hood or the several compartments 34 to prevent any extraneous gases from contaminating any leaking gas which it is desired to detect.

As the vehicle travels over the roadway, and if there is a leak in a gas main, the gas being lighter than air will rise to the surface and escape through small cracks in the road surface to enter one of the several compartments 34 when the hood is over the area where there is a leak. The leaking gas is rapidly conveyed along the length of the compartment to the pick-up tubes 56. Such rapid delivery of the leaking gas to the pick-up tubes is accomplished because of the entraining air under pressure in the chamber 24, which is forced out through the air outlets 52 and toward the pick-up tubes 56 as directed by a baffle 54. Thus, the gas analyzer E very quickly, in a fraction of a second, senses a leak over which the hood is carried by the vehicle, a line 13 carrying the leaking gas from the pick-up tubes 56 in a compartment. The air vents 46 allow the escape to the atmosphere of the air which entrains the gas to the tubes. A substantial area of roadway is scanned by the described hood structure and gas leak detection system.

It has been determined that with the system of the invention as hereinbefore described, detection of gas leaks is accurately determined and localized with the vehicle travelling as fast as twenty-five miles per hour. With the vehicle travelling at a given and fixed rate of speed, and with the leaking gas conveyed so rapidly to the gas analyzing meter by the described means conveying the leaking gas to the pick-up tubes, the point of leakage in a roadway may be determined to within a few feet of the exact spot where gas is escaping on the surface of the roadway.

It is believed that the advantages and improved results of the described hood and its relationship to the other elements of the described gas leak detection system when mounted on a vehicle will be apparent from the foregoing detailed description of a preferred embodiment of the invention. It will be apparent that various changes and modifications may be made without departing from the spirit and scope of the invention as sought to be defined in the following claims.

I claim:

1. A hood for detecting gas leaks adapted to be attached to a vehicle in close proximity to a roadway, said device comprising a frame member, a wall member beneath the frame member extending substantially parallel thereto and spaced therefrom, side walls extending between said frame and wall members providing an air chamber, an air inlet extending through the frame member in communication with the air chamber, a plurality of transversely spaced partitions extending longitudinally from the underside of the wall member, means extending across the ends of said partitions to provide a plurality of longitudinally extending compartments open to the bottom of the hood, an air outlet in the wall member in communication with each compartment at the front end thereof, and gas pick-up means for connection to gas analyzer means positioned in and at the rear of each compartment.

2. A hood for detecting gas leaks adapted to be attached to a vehicle in close proximity to a roadway, said hood comprising a frame member, a wall member beneath the frame member extending substantially parallel thereto and spaced therefrom, side walls extending between said frame and wall members providing an air chamber, an air inlet extending through the frame member in communication with the air chamber, a plurality of spaced orifices extending through the side walls, a plurality of spaced partitions extending longitudinally from the underside of the wall member, means extending across the ends of the partitions to provide a plurality of longitudinally extending compartments open to the bottom of the hood, and gas pick-up means for connection to the gas analyzer means positioned in and at the rear end of each compartment.

3. A hood as set forth in claim 2, wherein an air outlet is provided in the wall member in communication with each compartment at its front end, and means associated with each air outlet to direct air toward the rear of each compartment.

4. A hood as set forth in claim 3, wherein the frame member is provided with means for attaching the device to the underside of a vehicle; and wherein the hood has a width substantially equal to the width of a vehicle, the hood having substantial length.

5. A hood as set forth in claim 3, wherein the plurality of spaced orifices extending through the side walls are positioned to direct air downwardly to prevent contamination of the compartments with extraneous gases.

6. A hood as set forth in claim 3, wherein the gas pick-up means comprises a plurality of transversely spaced tubes, a manifold for each compartment, the pick-up tubes in each compartment leading to the manifold, and means for connecting the manifolds to the gas analyzer means.

7. A hood as set forth in claim 3, wherein the frame member is provided with means for attaching the device to the underside of a vehicle; wherein the hood has a width substantially equal to the width of a vehicle, the hood having substantial length; wherein the plurality of spaced orifices extending through the side walls are positioned to direct air downwardly to prevent contamination of the compartments with extraneous gases; wherein the gas pick-up means comprises a plurality of transversely spaced tubes, a manifold for each compartment, the pick-up tubes in each compartment leading to the manifold, and means for connecting the manifolds to the gas analyzer means; and wherein air vent means is provided rearwardly of the pick-up tubes.

8. Apparatus for detecting gas leaks comprising a vehicle and a hood attached to the vehicle for close proximity to a roadway, said hood comprising a horizontally extending frame member, a wall member beneath the frame member extending substantially parallel thereto and spaced therefrom, side walls extending between the frame and wall members providing an air chamber, an air inlet extending through the frame member in communication with the air chamber, an air blower in the vehicle in communication with the frame member air inlet, an air intake mounted on the vehicle remote from the underside of the vehicle and in communication with the air blower, a plurality of transversely spaced partitions extending longitudinally from the underside of the wall member, means extending across the ends of said partitions to provide a plurality of longitudinally extending compartments open to the bottom of the hood, an air outlet in the wall member in communication with each compartment at the front end thereof, and gas pick-up means positioned in and at the rear of each compartment, and gas analyzer means positioned in the vehicle connected to the gas pick-up means.

9. Apparatus for detecting gas leaks comprising a vehicle and a hood attached to the vehicle for close proximity to a roadway, said hood comprising a horizontally extending frame member, a wall member beneath the frame member extending substantially parallel thereto and spaced therefrom, side walls extending between the frame and wall members providing an air chamber, an air inlet extending through the frame member in communication with the air chamber, an air blower in the vehicle in communication with the frame member air inlet, an air intake mounted on the vehicle remote from the underside of the vehicle and in communication with the air blower, a plurality of spaced orifices extending through the side walls, a plurality of spaced partitions extending longitudinally from the underside of the wall member, means extending across the ends of the partitions to provide a plurality of longitudinally extending compartments open to the bottom of the hood, gas pick-up means positioned in and at the rear end of each compartment, and gas analyzer means positioned in the vehicle connected to the gas pick-up means.

10. Apparatus as set forth in claim 9, wherein an air outlet is provided in the wall member in communication with each compartment at its front end, and means associated with each air outlet to direct air toward the rear of each compartment.

11. Apparatus as set forth in claim 10, wherein the frame member is attached to the underside of the vehicle; and wherein the hood has a width substantially equal to the width of the vehicle, the length of the device being slightly less than the distance between the vehicle's front and rear wheels.

12. Apparatus as set forth in claim 10, wherein the plurality of spaced orifices extending through the side walls are positioned to direct air downwardly to prevent contamination of the compartments with extraneous gases.

13. Apparatus as set forth in claim 10, wherein the gas pick-up means comprises a plurality of transversely spaced tubes, a manifold for each compartment, the pick-up tubes in each compartment leading to the manifold, and means connecting the manifolds to the gas analyzer means.

14. Apparatus as set forth in claim 10, wherein the frame member is attached to the underside of the vehicle; wherein the hood has a width substantially equal to the width of the vehicle, the length of the hood being slightly less than the distance between the vehicle's front and rear wheels; wherein the plurality of spaced orifices extending through the side walls are positioned to direct air downwardly to prevent contamination of the compartments with extraneous gases; wherein the gas pick-up means comprises a plurality of transversely spaced tubes, a manifold for each compartment, the pick-up tubes in each compartment leading to a manifold, and means connecting the manifolds to the gas analyzer means; and wherein air vent means is provided rearwardly of the pick-up tubes.

References Cited

UNITED STATES PATENTS

| 2,879,663 | 3/1959 | Thomas | 73—26 |
| 3,364,727 | 1/1968 | Heath | 73—23 |

RICHARD C. QUIESSER, *Primary Examiner.*

C. I. McCLELLAND, *Assistant Examiner.*

U.S. Cl. X.R.

23—232